United States Patent [19]

Porter

[11] Patent Number: 4,850,513
[45] Date of Patent: Jul. 25, 1989

[54] CONTROL SYSTEM AND METHOD FOR HIGH PRODUCTION PLASTER PUMP

[76] Inventor: Donald L. Porter, 43 Ridgeway Dr., Greenville, S.C. 29605

[21] Appl. No.: 79,936

[22] Filed: Jul. 31, 1987

[51] Int. Cl.$^4$ .............................................. B67D 5/12
[52] U.S. Cl. ........................................ 222/1; 222/55; 222/63; 222/75; 222/330; 222/333; 239/76; 417/18; 417/38
[58] Field of Search .................. 222/1, 52, 55, 56, 57, 222/61, 63, 75, 330, 333; 417/18, 38, 900, 19, 20, 36, 43, 45; 239/76

[56] References Cited

U.S. PATENT DOCUMENTS

| | | | |
|---|---|---|---|
| 2,432,671 | 12/1947 | Longenecker | 417/900 X |
| 4,324,366 | 4/1982 | Geier et al. | 222/55 X |
| 4,516,700 | 5/1985 | Guzowski | 222/330 |
| 4,545,504 | 10/1985 | Fabel et al. | 222/63 X |
| 4,662,540 | 5/1987 | Schroter | 222/55 |
| 4,667,852 | 5/1987 | Siemann | 222/63 X |
| 4,682,710 | 7/1987 | Turner, Jr. et al. | 222/63 |
| 4,700,205 | 10/1987 | Rich et al. | 222/55 X |

FOREIGN PATENT DOCUMENTS 2177523   1/1987   United Kingdom .................. 222/63

Primary Examiner—Kevin P. Shaver
Attorney, Agent, or Firm—Cort Flint

[57] ABSTRACT

A control system and method is disclosed for a plaster pump 10. A pair of nozzles A, B dispenses material pumped from the nozzle and are connected by a "Y"-branch 50 in supply lines 11a and 11b to pump manifold 10a. Actual pressure signals 14a are compared in a comparator 16 to preset pressure signal 28. A differential pressure signal 16a is delivered to a signal switch 34 which controls a throttle driver 38 to control throttle 40 and pump 10. The pump may be throttled up or down to satisfy the pressure difference and bring the pressure to the desired preset pressure. An actual pressure signal 14c is delivered to an overpressure comparator circuit 26. An upper pressure limit signal 28a is compared to actual pressure by comparator 26. If an overpressure condition exists, an overpressure signal 26a is sent to signal switch 32 which shuts off or idles down the pump. If either nozzle A or B is shut off, a nozzle-off signal at 64a is sent to logic controller E. Switches 32 and 34 are off and signal switch 66 is open. Pressure compensator circuit 68 divides the pressure in half and provides an adjusted preset pressure signal at 68a. Comparator 70 compares the adjusted preset pressure signal at 68a to actual pressure signal at 14d. An adjusted differential pressure signal 70a is delivered to signal switch 66. Pressure will be reduced to one-half that of the original preset pressure.

11 Claims, 3 Drawing Sheets

CONTROL SYSTEM AND METHOD FOR HIGH PRODUCTION PLASTER PUMP

BACKGROUND OF THE INVENTION

The invention relates to a control system and method for a high production pump which pumps viscous materials such as plaster, slurry, and fireproofing materials. Recent improvements in this type of pump has resulted in higher production, particularly in pumping fireproof materials. One is Monokote brand material manufactured by W. R. Grace company. Generally, these materials are a cementitious (plaster) material which require the addition of water at the job site. These materials include 90-96% gypsum binder and aggregate with fiberglass, filters, and air entraining agents. The materials are highly spongy in a pumping state. Due to their nature, these materials may cause damage if pressures are not accurately controlled. Rupture of supply lines can occur if the pump remains on while the manual nozzle is closed creating high supply line pressures. With current improvements, production may be high enough to supply a pair of nozzles instead of one. This is usually done through a "Y"-branch. If one nozzle is cut off, the pressure will be too high in the remaining line. Supply line rupture may result. Another disadvantage of poor pressure regulation is material composition breakdown.

The invention has application to pumps generally of the type manufactured by the Essick Manufacturing Company of Charleston, South Carolina, model TM30, with improvements made for high production. Other typical plaster pumps are disclosed in U.S. Pat. Nos. 4,521,163, 2,432,671, and 2,146,709.

While there are control systems for dispensing fluids at regulated pressures or volumes, they have not been applicable or entirely suitable to controlling high production pumps which pump plaster and the like viscous materials. For example, see the current control systems in U.S. Pat. Nos. 4,442,953 and 3,997,080. Patent Nos. 3,885,739 and 1,953,393 disclose nozzles for dispensing fluid material with electrical switch controls at the nozzle. The later patent shows a pump turned on by a manual switch at the handle.

Accordingly, an object of the invention is to provide a control system and method for a high production plaster pump.

Another object of the invention is to provide a control system method for a high production pump which pumps plaster and other viscous materials which automatically protects against overpressures in the pumping system.

Another object of the invention is to provide a control system and method for a high production pump having plural dispensing nozzles wherein pressure is automatically regulated should one of the nozzles be closed.

Another object of the invention is to provide a control system and method for a high production plaster pump which controls pressure of the plaster or other viscous material in a manner that break down of the material does not occur.

SUMMARY OF THE INVENTION

For accomplishing the objectives, a control system is provided for controlling the pumping of pressurized plaster and the like material from a pump which is dispensed by a plurality of dispensing nozzles connected to the pump by a supply line. The control system includes a pressure transducer for determining the actual pressure of material pumped and for generating an actual pressure signal. A preset pressure signal is generated corresponding to a desired pressure of material pumped. A pressure comparator compares the actual and preset pressure signals and generates a differential signal corresponding to a difference between the actual and preset pressure signals. A nozzle logic circuit determines if any of the nozzles is in a closed nondispensing condition and generates a nozzle off signal in response. A compensator circuit receives the preset pressure signal and generates an adjusted preset pressure signal representing the preset pressure signal adjusted in proportion to the ratio of closed nozzles to the total number of nozzles. The comparator receives the adjusted preset pressure and actual pressure signals. An adjusted differential pressure signal is generated representing an adjusted pump pressure desired for the number of open nozzles. A logic switch circuit receives the differential pressure signal and the adjusted differential pressure signal. A pump motor driver controls a rate of pump operation to adjust the pressure of the material pumped. The logic switch in circuit actuates the driver means in response to the differential pressure signal to adjust the actual pressure to equal the preset pressure. The logic switch actuates the driver in response to the nozzle-off signal to adjust the actual pressure to equal the adjusted preset pressure. Material is pumped at a decreased pressure in proportion to the number of open nozzles. Preferably, the comparator includes a first comparator which receives the actual pressure and preset pressure signals for generating the differential pressure signal. The comparator includes a second comparator for receiving the actual and adjusted preset pressure signals for generating the adjusted differential pressure signal. The logic switch circuit comprises a first switch connected to the first comparator and a second switch connected to the second comparator.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Referring now in more detail to the drawings, a high production pump 10 includes a manifold 10a from which plaster and similar viscous material are pumped. The material is pumped via branched supply lines 11a and 11b through nozzles A and B. The aspects of the nozzles will be fully disclosed later.

Figure 2:
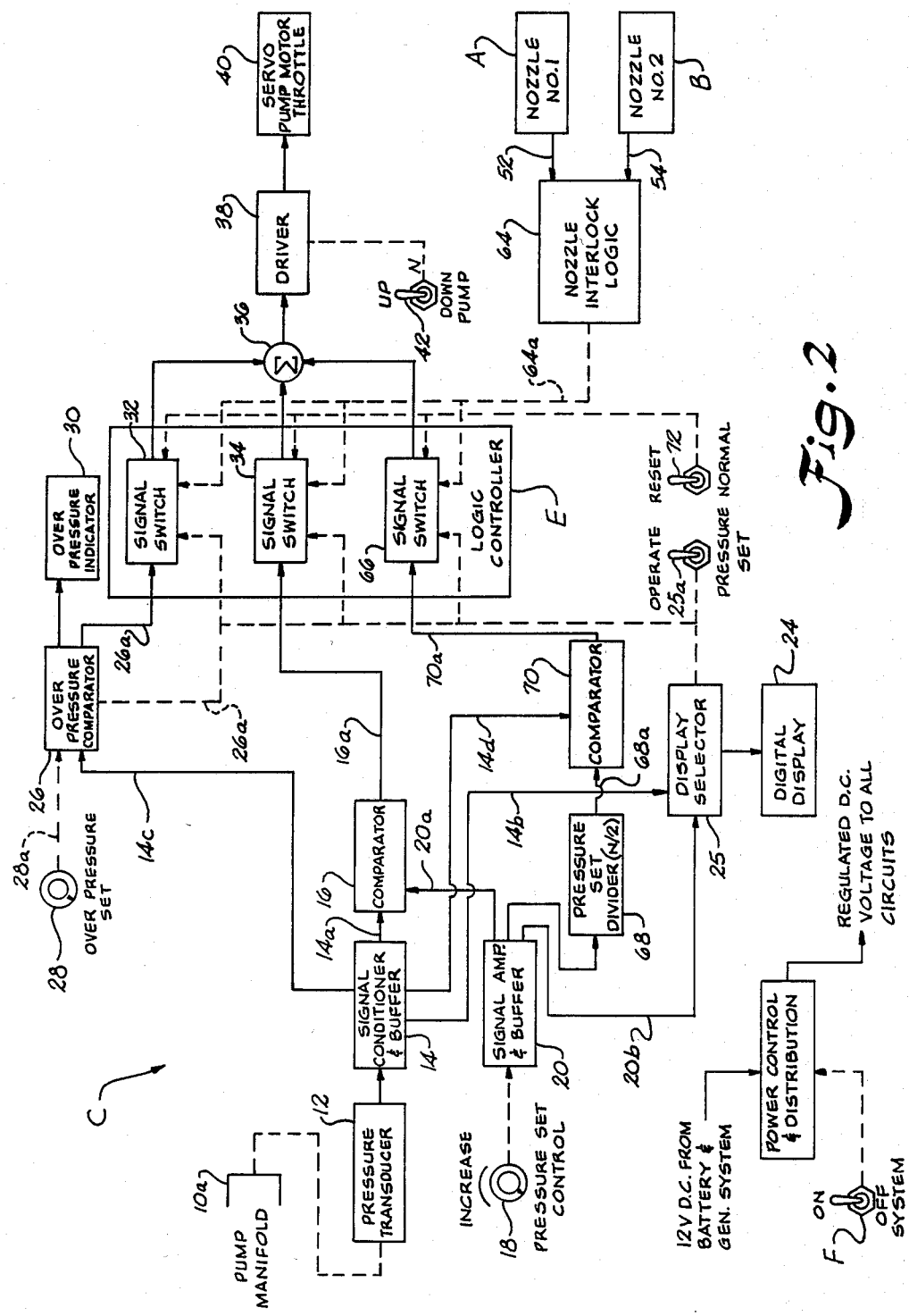
FIG. 2 is a schematic view illustrating a control system and method for a high production plaster pump in accordance with the invention.

As can best be seen in FIG. 2, a control system and circuit designated generally at C to regulate the pressure of material pumped is disclosed. A pressure transducer 12 is connected in the line adjacent to the pump manifold 10a. A signal conditioner and buffer circuit 14 receives the pressure signal from the transducer 12 and conditions if for comparison in a comparator means provided by a conventional comparator circuit 16. Comparator 16 generates a pressure differential signal at 16a corresponding to the difference between the actual pressure signal at 14a and a preset pressure signal. Signal conditioner circuit 14 may be any conventional conditioner means which will take the pressure transducer signal and buffer and condition it so that it may be at a level which can be compared.

At 18, a pressure control is illustrated which sets the pressure at a level which is desired from the pump. A preset pressure signal is delivered to a signal amplifier and buffer 20 which transmits the preset pressure signal at 20a to the comparator 16 for comparison with actual pressure signal 14a.

The conditioned and buffered output of 14 is delivered to a number of other circuits. One signal 14b goes to a digital display 24 via a display selector 25 controlled by switch 25a to indicate pressure. A visual digital display 24 may be displayed on a control panel D indicating the pressure is on. Amplifier and buffer 20 delivers a preset pressure signal at 20b to display selector 25. The display selector will display either the actual pressure or the preset pressure depending on the position of a switch 25a. Either pressure will be visually displayed on digital display 24 on control panel D.

A signal 14c is delivered to an overpressure comparator circuit 26 which has been set by an overpressure signal at 28a from an overpressure set control 28. This compares actual pressure signal 14c to overpressure signal 28a for safety. If actual pressure is above the pressure limit for safe operation, a signal is delivered to the overpressure indicator circuit 30 which will indicate at 30a on control panel D that the limit pressure has been exceeded. A visual or audible signal may be displayed or emitted. In addition, an overpressure signal 26a is generated by overpressure comparator circuit 26. Overpressure signal 26a goes to a signal switch 32 which decreases or shuts off the pump throttle. This will be fully explained later.

Differential pressure signal at 16a is sent to a signal switch circuit 34. Signal switch 34 receives the pressure signal in the normal course of operation. Signal switch 34 will deliver the pressure signal through the circuit if other conditions are satisfied. Once the signal is transmitted through the switch 34, it passes to a summation amplifier 36. Once the signal passes through the summing amplifier 36, it passes to a driver circuit 38 which moves a servo pump motor throttle 40. The throttle 40 throttles the pump to regulate pumping of plaster or other material at the pressure set by controller 18. A manual switch 42 may be used to increase or decrease throttle position and pressure. It will be noted that the summing amplifier 36 will pass the appropriate signal to the driver 38 as satisfied by the system logic.

Figure 1:
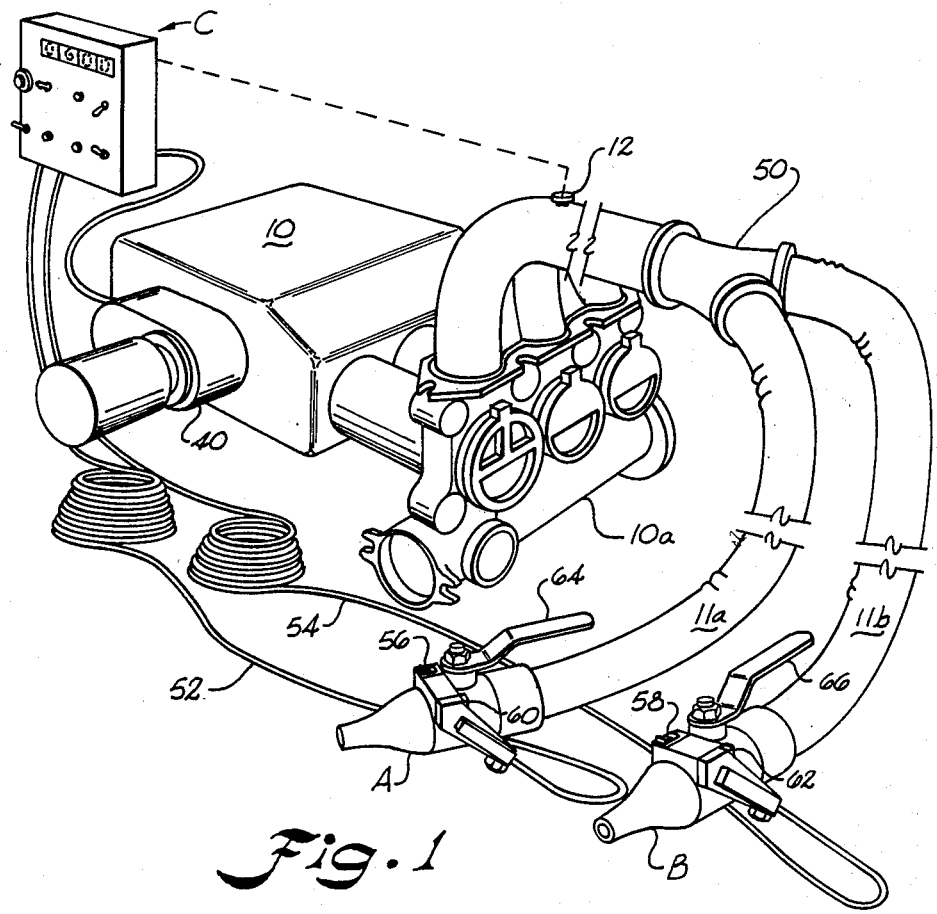
FIG. 1 is a perspective view of a dual nozzle "Y" branch dispensing system incorporated into the control system and method for a high production plaster pump in accordance with the invention.
Figure 3:
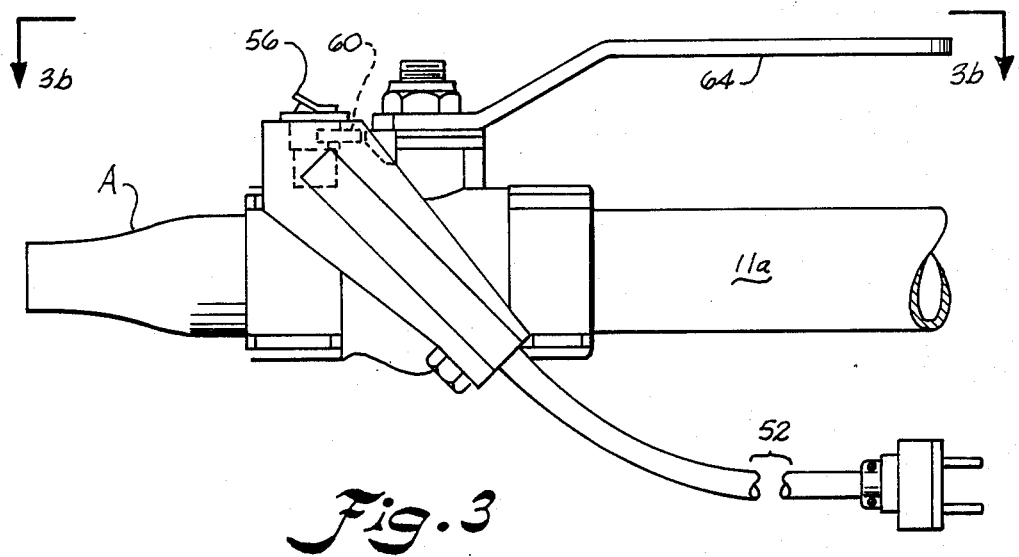
FIG. 3 is a side elevation of a nozzle incorporated into the control system of the present invention.
Figure 3B:
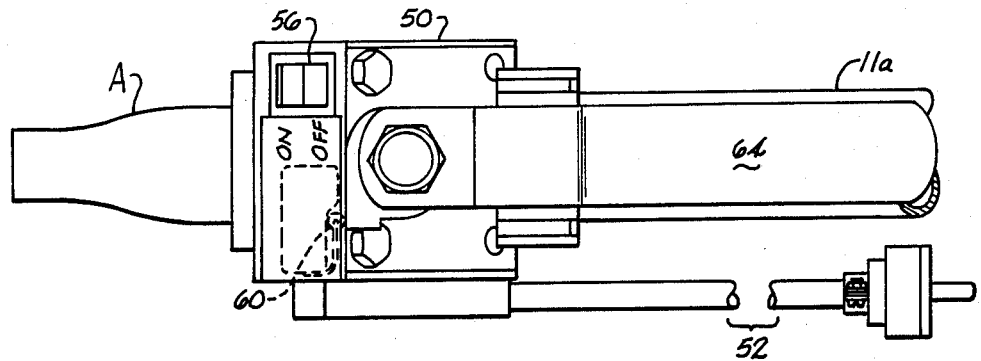
FIG. 3b is a top plan view of the nozzle of FIG. 3.
Figure 2A:
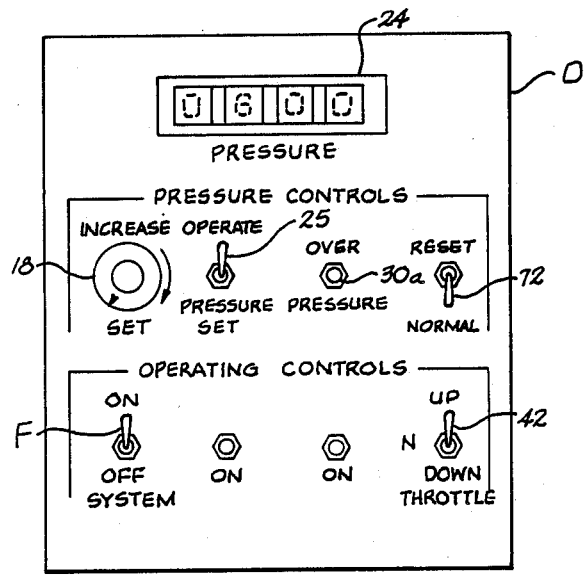
FIG. 2a is a front elevation of a control panel of a control system constructed in accordance with the present invention.

Referring now to FIGS. 1, 3, and 3b, nozzles A and B can be seen connected by a "Y" branch 50 to pump 10 for delivering plaster material. Electrical lines 52, 54 connect the respective nozzles to the control system C. There is a manual on/off electrical switch 56, 58 and a microswitch 60, 62 on each nozzle. Switches 56 and 60 are connected in series in line 52. Switches 58 and 62 are connected in series in line 54. Microswitches 60, 62 are actuated by manual valve handles 64, 66 when in a nozzle open position for dispensing. Both switches 56 and 60 or 58 and 62 must be actuated (on) for the pump to operate. The switch-on or nozzle-open signals are sent to a nozzle interlock logic circuit 64 which determines whether both nozzles are open for delivery. Nozzle interlock logic circuit 64 may be programmed to determien whether either nozzle is actuated for delivery or whether both are. A signal at 64a is delivered from logic circuit 64 to each logic signal switch 32 and 34 and also to a third signal switch 66. A nozzle-open signal is one of the conditions that must be met in order for signal switch 34 to deliver a signal for pump motor throttle 40. If manual valve 64 or 66 is closed, a nozzle-closed signal at 64a will be delivered to the signal switches. In this case, signal switch 34 and overpressure signal switch 32 will be closed. Signal switch 66 will be on. Preset pressure signal 20b from amplifier 20 is delivered to a compensator means which reduces the pressure in proportion to the ratio of closed nozzles to total nozzles. In the case of two nozzles in the system, the compensator means includes a pressure set divide circuit 68 which divides the preset pressure in half when only one nozzle is open. Signal 68a from pressure set divider 68 is delivered to a comparator 70 which also receives actual pressure signal 14d from conditioner circuit 14. A comparison of these signals establishes the new pressure reference should either nozzle be shut off. A differential signal 70a will be transmitted from comparator signal 70 to the signal switch circuit 66. In this situation, logic signal 64a will cut off signal switches 32 and 34 and close signal switch 66 which will pass the differential signal from comparator 70. The signal will be transmitted through the summary amplifier to the driver which will operate servo pump motor throttle 40 to shut back the pump and reduce the pressure to one half the original pressure.

Referring to the overpressure comparator circuit 26, when an overpressure condition exists, an overpressure signal 26a will be delivered to open signal switches 34 or 66 and close signal switch 32 which will transmit a signal to summary amplifier 36 which shuts down or idles the pump motor through the closing of servo pump motor throttle 40. Reset switch 72 is used to reset the signal switches after an overpressure condition. Actuating of the switch to the reset position and back to normal will reset the signal switches. Logic switch means E for controlling the rate of pump operation in response to actual pressure, overpressure, and nozzle-off signal includes signal switches 32, 34, and 66. These switches are controlled according to the described logic to control safe and efficient operation pressure. Normal condition of the signal switches is switches 32 and 66 off and signal switch 34 on. Master switch F controls the entire system and must be turned on first and will turn off the whole system when off. The various conditioner, buffer, comparator, switching, logic, and other circuits described may be any one of a number of conventional circuits. Provisions of the circuits would be within the ability of one skilled in the control art having been taught the aspects of the invention.

An advantageous construction for a control system can be had for controlling the pressure of plaster or other fluid. If one of a plurality of nozzles is closed, the pressure is reduced for safety. Rupture due to excessive pressure in the delivery lines is prevented. Pressure is controlled so that breakdown of the plaster or other fireproofing material does not occur. At certain high pressures it has been found that breakdown of the material does occur causing it to lose its fireproofability. The overall operation and efficiency of the pump system is improved. Control over the pumping of the plaster material will both increase the efficiency and rate at which it is applied and the overall coating applicating of the material.

While a preferred embodiment of the invention has been described using specific terms, such description is for illustrative purposes only, and it is to be understood that changes and variations may be made without departing from the spirit or scope of the following claims.

What is claimed is:

1. A control system for controlling the pumping of pressurized plaster and the like material from a pump which is dispensed by a plurality of dispensing nozzles connected to the pump by a supply line, said control system comprising:
   (a) means for determining the actual pressure of material pumped and for generating an actual pressure signal;
   (b) means for generating a preset pressure signal corresponding to a desired pressure of material pumped;
   (c) first comparator means for comparing said actual and preset pressure signals and generating a differential pressure signal corresponding to a difference between said actual and preset pressure signals;
   (d) nozzle logic means for determining if any of said nozzles is closed in a nondispensing condition and generating a nozzle off signal in response;
   (e) compensator means for receiving said preset pressure signal and generating an adjusted preset pressure signal representing the preset pressure signal adjusted in proportion to the ratio of the number of said closed nozzles to the total number of nozzles;
   (f) second comparator means for comparing said adjusted preset pressure signal and said actual pressure signal for generating an adjusted differential pressure signal representing an adjusted pump pressure desired for the remaining number of nozzles;
   (g) logic switch means receiving said differential pressure signal and said adjusted differential pressure signal;
   (h) driver means for controlling a rate of pump operation of said pump to adjust the pressure of the material pumped; and
   (i) said logic switch means having a first position for actuating said driver means in response to said differential pressure signal to control said pump and adjust said actual pressure to equal said preset pressure, said logic switch means having a second position in response to receiving said nozzle-off signal for actuating said driver means in response to said adjusted differential pressure signal while blocking said differential pressure signal to control said pump and adjust said actual pressure to equal said adjusted preset pressure in a manner that material is pumped at a decreased pressure in proportion to the number of closed nozzles.

2. The system of claim 1, wherein:
said logic switch means comprises a first logic switch connected to said first comparator and a second logic switch connected to said second comparator; and
said logic switch means closing said first switch and opening said second switch in response to said nozzle off signal.

3. The system of claim 1 wherein said plurality of nozzles consists of two dispensing nozzles and said control system controls said two dispensing nozzles, and said system comprises:
said nozzle logic means determining if one of said two nozzles is in said closed nondispensing condition and generating said nozzle off signal; and
said compensator means adjusting said preset pressure signal by dividing said preset pressure signal in half and generating said adjusted preset pressure signal corresponding to said divided preset pressure signal.

4. The system of claim 1 including:
a nozzle switch carried by each said nozzle;
each said nozzle including a manually operable valve handle;
said nozzle switch being actuated when said valve handle is moved to said closed position for generating said nozzle-off signal.

5. The system of claim 1 including:
means for generating a pressure limit signal representing an upper limit on safe pumping pressure of material pumped;
overpressure comparator means for comparing said actual pressure signal and said pressure limit signal and generating an overpressure signal when said actual pressure signal is greater than said pressure limit signal; and
said logic switch means actuating said driver means in response to receiving said overpressure signal to decrease said rate of pump operation and pressure of pump material to that below said pump pressure limit.

6. In a viscous material pump system which pumps pressurized plaster and the like material, a combination comprising a viscous material pump, a dispensing nozzle connected to the pump, a supply line for connecting said pump and dispensing nozzle, and a control system comprising:
pressure sensor means for determining the actual pressure of pumped material and for generating an actual pressure signal;
preset pressure means for generating a preset pressure signal corresponding to a desired pressure of said pumped material;
a first pressure comparator for comparing said actual and preset pressure signals and generating a differential pressure signal corresponding to a difference between said actual and preset pressure signals;
over pressure set means for establishing an over pressure limit signal representing an upper limit on safe pumping pressure of said pumped material;
an over pressure comparator for comparing said actual pressure signal and said pressure limit signal and generating an over pressure signal when said actual pressure signal is greater than said pressure limit signal;
driver means for controlling a rate of pump operation of said pump to adjust the pressure of said pumped material;
electrical nozzle logic circuit means for determining when said nozzle is in a closed condition and generating an electrical nozzle-off signal;

electrical logic switching circuit means for receiving said differential pressure signal, said over pressure signal, and said nozzle-off signal; said logic switch means having a first position for transmitting said differential pressure signal to said driver means for adjusting said actual pressure to said preset pressure, a second position for transmitting said over pressure signal to said driver means for generally stopping pump operation while blocking said differential pressure signal, and said logic switch means having a third position in which said driver means is controlled at a reduced rate of operation for adjusting said actual pressure to a reduced pressure; and said logic switch means being switched to said first position in response to said differential pressure signal, said logic switch means being switched to said second position in response to said over pressure signal, and said logic switch means being switched to said third position in response to said nozzle-off signal.

7. The system of claim 6 including reset switch means connected to said logic switch means for resetting said logic switch to normal operation following a overpressure signal and decrease in said rate of pump operation to return said pump to a normal rate of pump operation.

8. A method for controlling the pumping of pressurized plaster and the like material from a pump from which material is dispensed by a number of dispensing nozzles connected to the pump by a supply line, said method comprising:
(a) establishing an actual pressure signal representing the actual pressure of material pumped;
(b) establishing a preset pressure signal corresponding to a desired pressure of material pumped;
(c) comparing said actual pressure signal and said preset pressure signal and generating a pressure differential signal representing the difference between said actual pressure signal and said preset pressure signal;
(d) adjusting the rate of pump operation in response to said pressure differential signal;
(e) detecting whether one of said nozzles is in a closed non-dispensing condition and generating a nozzle-off signal;
(f) electrically transmitting said pressure differential signal and said nozzle-off signal simultaneously to a logic switching circuit;
(g) transmitting said pressure differential signal through said logic switching circuit in the absence of a nozzle-off signal for adjusting the rate of pump operation so that said actual pressure and preset pressure signals are generally equal; and
(h) processing said nozzle-off signal in said logic switching circuit in response to the presence of a nozzle-off signal for blocking the transmission of said pressure differential signal and for controlling said pump to reduce the pressure of pumped material in response to said nozzle-off signal so that the pressure of pumped material is reduced in proportion to the number of nozzles detected in said non-dispensing condition.

9. The method of claim 8 including:
establishing an overpressure signal representing the limit on pressure at which said pump operation may safely occur; and
comparing said overpressure signal to said actual pressure signal and reducing the rate of pump operation in response to said overpressure signal.

10. The method of claim 8 including:
(a) adjusting said preset pressure signal by reducing the signal in proportion to the number of closed nozzles and generating corresponding adjusted preset pressure signal;
(b) comparing said adjusted preset pressure signal and said actual pressure signal; and
(c) adjusting the rate of pump operation to reduce said pressure in response to the difference between said adjusted preset pressure signal and said actual pressure signal.

11. The method of claim 8 wherein said number of nozzles consists of a pair of nozzles connected to said pump for dispensing said material and including:
(a) adjusting said preset pressure signal by dividing said preset pressure signal in half in proportion to the number of closed nozzles and generating corresponding adjusted preset pressure signal;
(b) comparing said adjusted preset pressure signal and said actual pressure signal; and
(c) adjusting the rate of pump operation to reduce said pressure in response to the difference between said adjusted preset pressure signal and said actual pressure signal.

* * * * *